(12) United States Patent
Baik et al.

(10) Patent No.: US 9,829,379 B2
(45) Date of Patent: Nov. 28, 2017

(54) TWO-DIMENSIONAL SPECTROSCOPY SYSTEM AND TWO-DIMENSIONAL SPECTROSCOPIC ANALYSIS METHOD

(71) Applicants: Samsung Electronics Co., Ltd., Suwon-si (KR); MASSACHUSETTS INSTITUTE OF TECHNOLOGY, Cambridge, MA (US)

(72) Inventors: Chan-Wook Baik, Yongin-si (KR); Ogan Gurel, Seongnam-si (KR); Benjamin Kwasi Ofori-Okai, Cambridge, MA (US); Christopher Alan Werley, Cambridge, MA (US); Keith Adam Nelson, Newton, MA (US); Stephanie Meng-Yan Teo, Cambridge, MA (US)

(73) Assignees: SAMSUNG ELECTRONICS CO., LTD., Suwon-si (KR); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 14 days.

(21) Appl. No.: 14/884,478

(22) Filed: Oct. 15, 2015

(65) Prior Publication Data
US 2016/0131527 A1    May 12, 2016

(30) Foreign Application Priority Data
Oct. 15, 2014 (KR) ........................ 10-2014-0139259

(51) Int. Cl.
*G01N 21/55* (2014.01)
*G01J 3/10* (2006.01)
(Continued)

(52) U.S. Cl.
CPC ................. *G01J 3/108* (2013.01); *G01J 3/42* (2013.01); *G01J 3/457* (2013.01)

(58) Field of Classification Search
CPC ........ G01J 3/108; G01J 3/42; G01J 2003/102; G01J 3/453; G01J 3/457; F21K 99/00; F21S 2/00; H01L 33/48
(Continued)

(56) References Cited

U.S. PATENT DOCUMENTS

2013/0221222 A1   8/2013  Baiz et al.
2013/0335735 A1   12/2013 Kambhampati et al.

OTHER PUBLICATIONS

Baiz, et al.; "Introduction to Protein 2D IR Spectroscopy", Ultrafast Infrared Vibrational Spectroscopy, Jun. 1, 2012, 38 pages total.
(Continued)

*Primary Examiner* — Tri T Ton
(74) *Attorney, Agent, or Firm* — Sughrue Mion, PLLC

(57) ABSTRACT

A two-dimensional (2D) spectroscopy system and a 2D spectroscopic analysis method are disclosed. The 2D spectroscopy system includes: a light transmission delayer configured for forming a plurality of first light pulses from first light pulse and causing a relative time delay therebetween; a response pulse wave generator configured for generating a plurality of response pulse waves responds and having a relative time delay, and for irradiating the plurality of response pulse waves on the sample; an optical readout pulse array generator configured for forming an optical readout pulse array by splitting the second light pulse into a plurality of regions having different time delays and spatially discriminated from one another; and a reader configured for reading out by overlapping the optical readout pulse array with a signal generated from the sample.

19 Claims, 7 Drawing Sheets

(51) Int. Cl.
*G01J 3/42* (2006.01)
*G01J 3/457* (2006.01)

(58) Field of Classification Search
USPC ..... 356/445–448, 237.1–237.6, 239.1–239.8
See application file for complete search history.

(56) References Cited

OTHER PUBLICATIONS

Groma, et al.; "Terahertz Radiation from Bacteriorhodopsin Reveals Correlated Primary Electron and Proton Transfer Processes", Proceedings of the National Academy of Sciences, May 2008, vol. 105, No. 19, 6 pages total.

Hoffmann, et al.; "THz-pump/THz-probe Spectroscopy of Semiconductors at High Field Strengths [Invited]", Journal of the Optical Society of America B, Sep. 2009, vol. 26, No. 9, 6 pages total.

Holst: "The Poisson-Boltzmann Equation: Analysis and Multilevel Numerical Solution", 1994, 234 pages total.

Jeon, et al.; "Two-Dimensional Optical Spectroscopy: Theory and Experiment", Encyclopedia of Analytical Chemistry, Dec. 2010, 30 pages total.

Khalil, et al.; "Coherent 2D IR Spectroscopy: Molecular Structure and Dynamics in Solution", Journal of Physical Chemistry A, Jun. 2003, vol. 107, No. 27, 22 pages total.

Kim, et al.; "Single-Shot Terahertz Pulse Characterization via Two-Dimensional Electro-Optic Imaging with Dual Echelons", Optics Letters, Jul. 2007, vol. 32, No. 14, 3 pages total.

Kuehn, et al.; "Two-Dimensional Terahertz Correlation Spectra of Electronic Excitations in Semiconductor Quantum Wells", The Journal of Physical Chemistry B, Dec. 2010, vol. 115, No. 18, 8 pages total.

Poulin, et al.; "Irreversible Organic Crystalline Chemistry Monitored in Real Time", Science, Sep. 2006, vol. 313, No. 5794, 6 pages total.

Tian, et al.; "Femtosecond Phase-Coherent Two-Dimensional Spectroscopy", Science, Jun. 2003, vol. 300, No. 5625, 4 pages total.

Wakeham, et al.; "Dual-Echelon Single-Shot Femtosecond Spectroscopy", Optics Letters, Apr. 2000, vol. 25, No. 7, 3 pages total.

G. Acbas et al., "Optical measurements of long-range protein vibrations," Nature Communications, DOI: 10.1038/ncomms 4076, received Jul. 19, 2013, published Jan. 16, 2014, pp. 1-7.

M. Karplus and J. Kuriyan, "Molecular dynamics and protein function," Proceedings of the National Academy of Sciences, vol. 102, No. 19, pp. 6679-6685, May 10, 2005.

TWO-DIMENSIONAL SPECTROSCOPY SYSTEM AND TWO-DIMENSIONAL SPECTROSCOPIC ANALYSIS METHOD

CROSS-REFERENCE TO RELATED APPLICATION

This application claims priority from Korean Patent Application No. 10-2014-0139259, filed on Oct. 15, 2014, in the Korean Intellectual Property Office, the disclosure of which is incorporated herein by reference in its entirety.

BACKGROUND

1. Field

Exemplary embodiments relate to methods and apparatuses for a spectroscopy system and a spectroscopic analysis method, and more particularly, to a two-dimensional (2D) spectroscopy system and a 2D spectroscopic analysis method.

2. Description of the Related Art 2D spectroscopy uses infrared rays or visible rays. Recently, terahertz (THz) absorption spectroscopy has been used to measure a low frequency vibrational mode for a large molecule and a crystalline solid. It is predicted that a THz spectrum for identifying characteristics of a biomolecule including protein undergoing a large scale motion is within a THz range (about 0.2 to about 2 THz). However, since THz absorption spectra of many biomolecules are broad, an improvement is necessary to identify characteristics of biomolecules.

SUMMARY

Provided are a two-dimensional (2D) spectroscopy system and a 2D spectroscopic analysis method capable of identifying characteristics of various objects.

Provided are a 2D spectroscopy system and a 2D spectroscopic analysis method capable of reducing a data acquisition time by removing scanning of optical readout pulses.

Additional aspects will be set forth in part in the description which follows and, in part, will be apparent from the description, or may be learned by practice of the presented exemplary embodiments.

According to an aspect of an exemplary embodiment, a two-dimensional (2D) spectroscopy system includes: a pulsed light source; a beam splitter configured to split light pulses provided from the pulsed light source into first light pulse and second light pulse; a light transmission delayer configured to form a plurality of first light pulses from the first light pulse and to cause a first relative time delay with respect to the plurality of first light pulses; a response pulse wave generator configured to generate a plurality of response pulse waves having a wavelength range to which a sample to be analyzed responds and having a second relative time delay by using the plurality of first light pulses sequentially inputted from the light transmission delayer, and to irradiate the plurality of response pulse waves upon the sample; an optical readout pulse array generator configured to form an optical readout pulse array by splitting the second light pulse into a plurality of regions which have different respective time delays and which are spatially discriminated from one another; a reader configured to read out a signal by overlapping the optical readout pulse array with a signal generated from the sample in response to the irradiation of the plurality of response pulse waves upon the sample; an image detector configured to detect a signal image of the signal read out by the reader; and a signal processor configured to acquire spectroscopic analysis information which relates to the sample by processing the signal image detected by the image detector.

The plurality of response pulse waves may include at least two response pulse waves, and the signal generated from the sample may be generated by irradiating the plurality of response pulse waves upon the sample.

The light transmission delayer may be further configured to control the first relative time delay.

The optical readout pulse array generator may be further configured to temporally and spatially split the second light pulse into a 2D array of optical readout pulses by using a first echelon and a second echelon which is arranged crossed to the first echelon.

The 2D spectroscopy system may further include at least one from among a first relay focuser configured to collimate and condense the response pulse waves generated by the response pulse wave generator and to focus the response pulse waves on the sample and a second relay focuser configured to collimate and condense the signal generated from the sample and to input the signal to the reader.

The at least one from among the first relay focuser and the second relay focuser may include one pair of off-axis parabolic reflectors.

The reader may include an electro-optic (EO) crystal configured to read out a signal by performing EO sampling which includes overlapping the signal generated from the sample with the optical readout pulse array.

The 2D spectroscopy system may further include a quarter-wave plate configured to change a polarization of the signal which is read out by the reader; and a polarization splitter configured to split the signal, which has propagated through the quarter-wave plate, based on the changed polarization thereof, wherein each of the quarter-wave plate and the polarization splitter is arranged between the reader and the image detector.

The polarization splitter may include a Wollaston prism.

The sample may include at least one from among a semiconductor, a dielectric, and a biomolecule.

Each of the plurality of response pulse waves may include one from among a single-cycle visible ray, a multi-cycle visible ray, an infrared ray, and a terahertz (THz) wave.

The sample may include a biomedical sample, and the signal processor may be further configured to determine a presence or a non-presence of a desired biomolecule by using identification and quantification of a spectroscopic peak for at least one from among an absorption spectrum of the sample and an emission spectrum of the sample.

The spectroscopic analysis information may include at least one of the absorption spectrum of the sample and the emission spectrum of the sample, and the at least one from among the absorption spectrum and the emission spectrum may be generated by using a Fourier transform of the detected signal image.

According to an aspect of another exemplary embodiment, a two-dimensional (2D) spectroscopic analysis method includes: splitting light pulses provided from a pulsed light source into first light pulse and second light pulse; forming a plurality of first light pulses from the first light pulse and causing a first relative time delay with respect to the plurality of first light pulses; generating a plurality of response pulse waves having a wavelength range to which a sample to be analyzed responds and having a second relative time delay by using the plurality of first light pulses having the first relative time delay, and irradiating the plurality of response pulse waves upon the sample; forming an optical readout pulse array by splitting the second light pulses into a plurality of regions which have different respective time delays and which are spatially discriminated from one another; reading out a signal by overlapping the optical readout pulse array with a signal generated from the sample in response to the irradiation of the plurality of response pulse waves upon the sample; detecting a signal image of the signal which is read out; and acquiring spectroscopic analysis information which relates to the sample by processing the detected signal image.

The plurality of response pulse waves may include at least two response pulse waves, and the reading out the signal may include overlapping the optical readout pulse array with the signal generated from the sample by the irradiating the plurality of response pulse waves upon the sample.

Each of the plurality of response pulse waves may include one from among a single-cycle visible ray, a multi-cycle visible ray, a single-cycle infrared ray, a multi-cycle infrared ray, a single-cycle terahertz (THz) wave, and a multi-cycle THz wave.

The forming the optical readout pulse array may include forming the optical readout pulse array to have different respective time delays and to be spatially discriminated by using a first echelon which is focused on the sample and a second echelon which is arranged opposite to the first echelon and which may be focused on the sample.

The sample may include a biomedical sample, and the acquiring the spectroscopic analysis information which relates to the sample may include determining a presence or a non-presence of a desired biomolecule by acquiring at least one from among an absorption spectrum of the sample and an emission spectrum of the sample and using identification and quantification of a spectroscopic peak.

The spectroscopic analysis information may include at least one from among the absorption spectrum of the sample and an emission spectrum of the sample, and the at least one spectrum may be generated by using a Fourier transform of the detected signal image.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
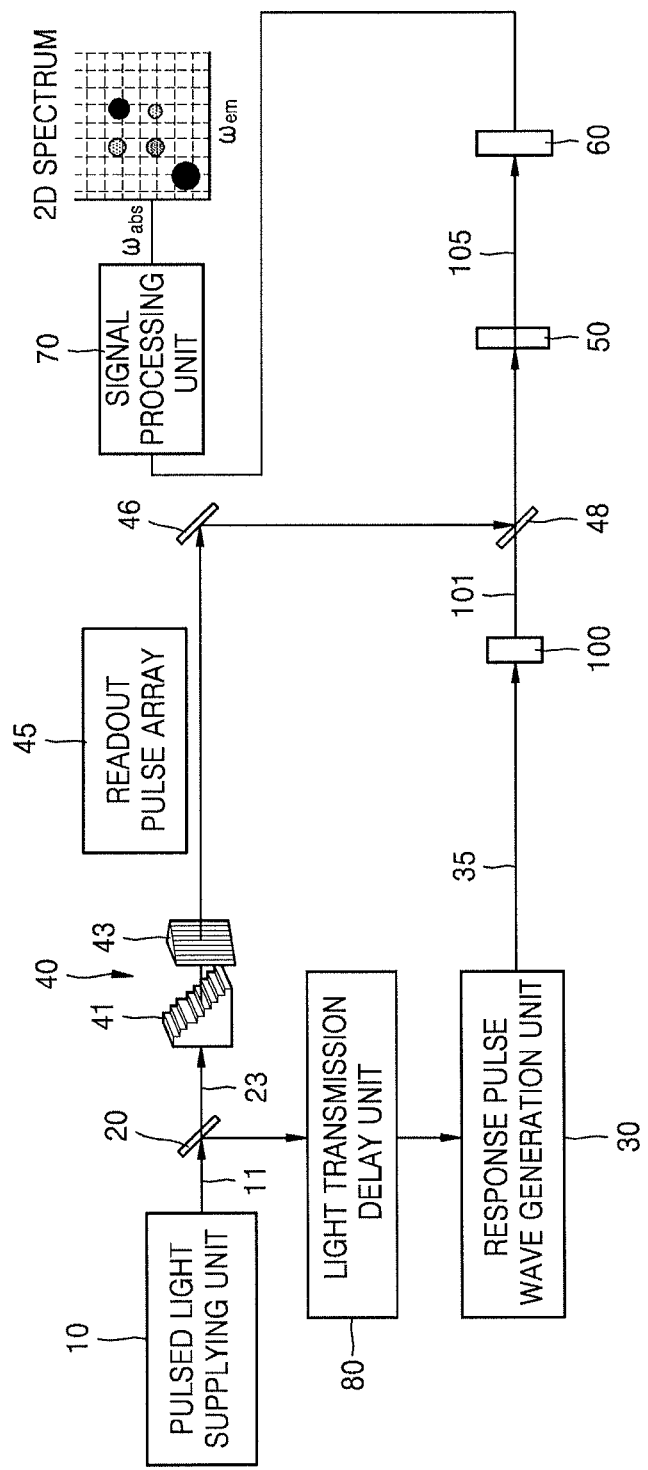
FIG. 1 is a schematic block diagram of a two-dimensional (2D) spectroscopy system, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

A two-dimensional (2D) spectroscopy system and a 2D spectroscopic analysis method according to one or more exemplary embodiments will now be described in detail with reference to the accompanying drawings. Like reference numerals in the drawings denote like elements. In the drawings, the structures or sizes of components are exaggerated for convenience and clarity of description. In addition, the exemplary embodiments described below are only illustrative, and various modifications can be made from the exemplary embodiments. In addition, when it is described that a certain component is above another component, the certain component may be directly above another component, or a third component may be interposed therebetween.

As used herein, the term "and/or" includes any and all combinations of one or more of the associated listed items. Expressions such as "at least one of," when preceding a list of elements, modify the entire list of elements and do not modify the individual elements of the list. As used herein, the term "unit" may refer to a component which is implemented in hardware, such as, for example, a device and/or circuitry. Alternatively, the term "unit" may refer to a software implementation and/or as a hybrid implementation of hardware and software.

Figure 2:
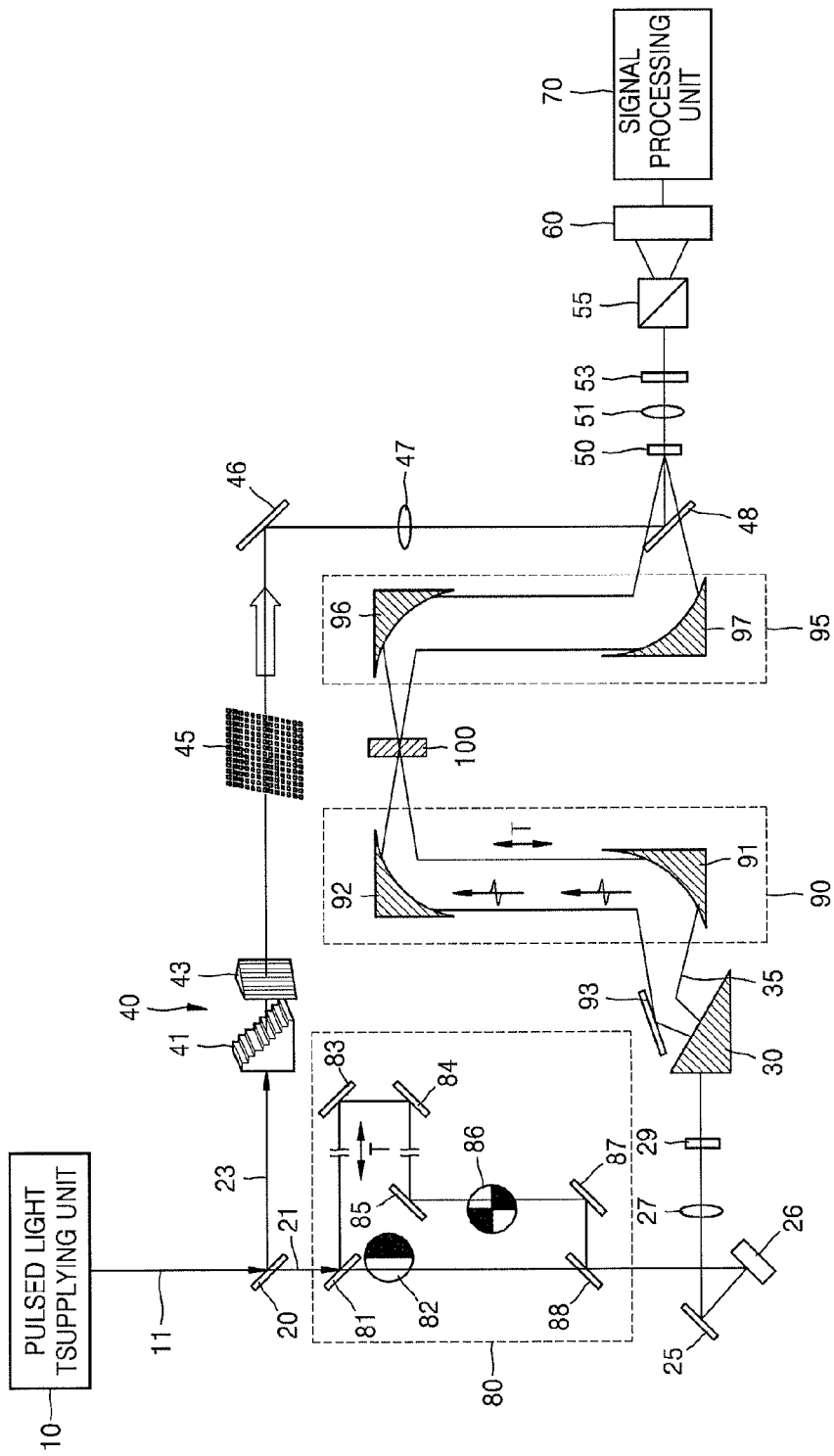
FIG. 2 illustrates an optical system structure which is applicable to the 2D spectroscopy system of FIG. 1.

FIG. 1 is a schematic block diagram of a 2D spectroscopy system according to an exemplary embodiment. FIG. 2 illustrates an optical system structure which is applicable to the 2D spectroscopy system of FIG. 1.

Referring to FIGS. 1 and 2, the 2D spectroscopy system includes a pulsed light supplying unit (also referred to herein as a "pulsed light source") 10, a beam splitter 20, a light transmission delay unit (also referred to herein as a "light transmission delayer") 80, a response pulse wave generation unit (also referred to herein as a "response pulse wave generator") 30, an optical readout pulse array formation unit (also referred to herein as an "optical readout pulse array generator") 40, a readout unit (also referred to herein as a "reader") 50, an image detection unit (also referred to herein as an "image detector") 60, and a signal processing unit (also referred to herein as a "signal processor") 70. Although FIGS. 1 and 2 show that the image detection unit 60 and the signal processing unit 70 are individual components, the image detection unit 60 and the signal processing unit 70 may be configured in one unit.

The pulsed light supplying unit 10 may provide, for example, a femtosecond optical laser light pulse. A light pulse light 11 provided by the pulsed light supplying unit 10 may be split into first light pulse 21 and second light pulse 23 by the beam splitter 20. The light transmission delay unit 80 may form a plurality of first light pulses 21 from the first light pulse 21 and cause a relative time delay between the plurality of first light pulses 21. In this case, the light transmission delay unit 80 may control the relative time delay.

For example, the light transmission delay unit 80 may include a beam splitter 81 and a plurality of mirrors 83, 84, 85, and 87, for splitting the first light pulse 21 into two first light pulses 21 and causing the two light first pulses 21 to propagate along a first path and a second path delayed by a time T, respectively, and a beam combiner 88 for combining the two first light pulses 21 which has travelled along the first and second paths. Choppers 82 and 86 may be disposed on the first and second paths, respectively. Although FIG. 2 shows that the chopper 82 for passing light once per revolution is disposed on the first path and the chopper 86 for passing light twice per revolution is disposed on the second path, this is only illustrative. Rotation speeds of the choppers 82 and 86 may be controlled to pass or block the two first light pulse 21. For example, according to control of the rotation speeds of the choppers 82 and 86, the presence or non-presence of the light first pulse 21 propagating along the first path and the first light pulse 21 propagating along the second path at the response pulse wave generation unit 30 may be adjusted.

Although FIG. 2 shows that the first light pulse 21 is split into two first light pulses 21, a relative time delay is caused therebetween, and the two first light pulses 21 are combined again, this is only an illustration of the light transmission delay unit 80, and the present exemplary embodiment is not limited thereto. For example, the light transmission delay unit 80 may split the first light pulse 21 into three or more first light pulses 21, cause a relative time delay with respect to the three or more first light pulses 21, and combine the three or more first light pulses 21 having the relative respective time delay therebetween. In this case, the light transmission delay unit 80 may further include a beam splitter, a beam combiner, a mirror, a chopper, and the like.

The plurality of first light pulses 21 having the relative time delay, which are obtained by the light transmission delay unit 80, may be reflected from mirrors 26 and 25, condensed by a condensing lens 27, and inputted into the response pulse wave generation unit 30.

The response pulse wave generation unit 30 may generate a plurality of response pulse waves 35 having a wavelength range to which a sample 100 to be analyzed responds and having a relative time delay by using the plurality of first light pulses 21 sequentially inputted from the light transmission delay unit 80, and then irradiate the plurality of response pulse waves 35 upon the sample 100. Herein, the plurality of response pulse waves 35 may include at least two response pulse waves 35. For example, the plurality of response pulse waves 35 may include three response pulse waves or four response pulse waves. A signal 101, e.g., a nonlinear signal, generated by irradiating the plurality of response pulse waves 35 upon the sample 100 may be generated after irradiating the plurality of response pulse waves 35 having a relative time delay upon the sample 100. When the plurality of response pulse waves 35 having a relative time delay are three in number, the three response pulse waves 35 may be used as an excitation pulse wave for exciting an irradiated portion of the sample 100, a waiting pulse wave, and a detection pulse wave, respectively.

The response pulse wave generation unit 30 may generate a response pulse wave 35 of, for example, a visible band, an infrared band, or a terahertz (THz) band, according to a type of the sample 100 to be analyzed. The sample 100 may include any one of a semiconductor, a dielectric, and a biomolecule. For example, when the sample 100 is a biomedical sample, and a biomolecule to be analyzed is protein having a low frequency vibrational mode, the response pulse wave generation unit 30 may generate a THz wave. Hereinafter, a case where the response pulse wave 35 is a THz wave will be described as an example for convenience of description.

For example, the response pulse wave generation unit 30 may include a nonlinear crystal, e.g., a lithium niobate ($LiNbO_3$) crystal, for generating a THz wave in response to the inputted first light pulse 21. In this case, the response pulse wave 35 may include a single-cycle THz wave or multi-cycle THz wave. The single-cycle THz wave may have a broad wavelength range so as to be used to measure coupling between vibrational modes. The multi-cycle THz wave may have a narrow wavelength range so as to be used to determine a cause of inhomogeneous broadening in 2D spectroscopic measurement. To increase the generation efficiency of the response pulse wave 35 in the response pulse wave generation unit 30, a half-wave plate 29 for changing polarization of the inputted first light pulse 21 may be further included at a front end of the response pulse wave generation unit 30.

The 2D spectroscopy system according to the present exemplary embodiment may further include a first relay focusing unit (also referred to herein as a "first focuser") 90 for collecting the THz wave generated by the response pulse wave generation unit 30 and irradiating the concentrated THz wave on the sample 100, and a second relay focusing unit (also referred to herein as a "second focuser") 95 for collecting a signal generated from the sample 100 and inputting the collected signal into the readout unit 50. The THz wave generated by the response pulse wave generation unit 30 may be reflected from a mirror 93 and inputted into the first relay focusing unit 90.

The first relay focusing unit 90 may include one pair of off-axis parabolic reflectors 91 and 92 for collimating and condensing the THz wave generated by the response pulse wave generation unit 30 and focusing the THz wave on the sample 100.

The second relay focusing unit 95 may include one pair of off-axis parabolic reflectors 96 and 97 for collimating and condensing the signal 101 generated from the sample 100 and focusing the signal 101 on the readout unit 50.

The optical readout pulse array formation unit 40 may form a readout pulse array 45 by splitting the second light pulse 23 into a plurality of regions having different time delays and which are spatially discriminated from one another. The optical readout pulse array formation unit 40 may temporally and spatially split the second light pulse 23 into readout light pulses of a 2D array by means of, for example, one pair of echelons, i.e., a first echelon 41 and a second echelon 43, which are arranged cross to each other.

For example, when the one pair of echelons 41 and 43 have m steps and n steps, respectively, the one pair of echelons 41 and 43 have m×n paths different from each other for the inputted second light pulse 23, and thus, the readout pulse array 45 having different time delays and spatially discriminated from one another may be formed.

The readout pulse array 45 formed by the optical readout pulse array formation unit 40 is formed by a single light pulse and may be inputted into the readout unit 50 by changing a path thereof by mirrors 46 and 48 such that the readout pulse array 45 overlaps with the signal 101 generated from the sample 100.

The readout unit 50 may read the signal 101 by overlapping the readout pulse array 45 with the signal 101 generated from the sample 100 according to the irradiation of the plurality of response pulse waves 35 having time delays upon the sample 100.

The readout unit 50 may include an electro-optic (EO) crystal for reading out a signal by means of EO sampling by overlapping the signal 101 generated from the sample 100 with the optical readout pulse array 45. For example, the readout unit 50 may include an EO crystal formed of a zinc telluride (ZnTe) crystal. In the readout unit 50, the signal 101 generated from the sample 100 and the optical readout pulse array 45 may interact, thereby obtaining a readout signal

105. The readout signal 105 obtained by the readout unit 50 is condensing by a light-condensing lens 51 and inputted into the image detection unit 60.

The image detection unit 60 detects a signal image which corresponds to the readout signal 105 obtained by the readout unit 50, and the signal processing unit 70 acquires spectroscopic analysis information which relates to the sample 100 by processing a signal image detected by the image detection unit 60.

A quarter-wave plate 53 which is configured for changing a polarization of the readout signal 105 obtained by the readout unit 50 and a polarization beam splitter 55 which is configured for splitting the signal, which has propagated through the quarter-wave plate 53, based on the polarization may be further included and may be arranged between the readout unit 50 and the image detection unit 60. The polarization beam splitter 55 may include, for example, a Wollaston prism.

The spectroscopic analysis information of the sample 100, which is acquired by the signal processing unit 70 may be, for example, at least one of an absorption spectrum of the sample and an emission spectrum of the sample, and the at least one spectrum may be obtained by using a Fourier transform of the detected signal image.

The 2D spectroscopy system may acquire the spectroscopic analysis information of the sample 100 by executing the procedures to be described below.

First, the light pulse provided from the pulsed light supplying unit 10 is split into the first light pulse 21 and the second light pulse 23 by the beam splitter 20. A plurality of first light pulse 21 having a relative time delay are formed from the first light pulse 21 by the light transmission delay unit 80. The plurality of first light pulses 21 having a relative time delay are inputted into the response pulse wave generation unit 30, and accordingly, the plurality of response pulse waves 35 which have a wavelength range to which the sample 100 to be analyzed responds and which have a relative time delay are generated. The second light pulse 23 is split into a plurality of regions which have different respective time delays and which are spatially discriminated from one another by the optical readout pulse array formation unit 40, and the optical readout pulse array 45 is formed by the optical readout pulse array formation unit 40. The signal 101 generated from the sample 100 according to the irradiation of the plurality of response pulse waves 35 on the sample 100 overlaps with the optical readout pulse array 45 on the readout unit 50 and interacts with the optical readout pulse array 45, and accordingly, the readout signal 105 is obtained. The readout signal 105 is detected by the image detection unit 60, and a signal image detected by the image detection unit 60 is processed by the signal processing unit 70. Accordingly, the signal processing unit 70 acquires the spectroscopic analysis information of the sample 100. For example, when the sample 100 is a biomedical sample, in the acquisition of the spectroscopic analysis information of the sample 100 in the signal processing unit 70, at least one of an absorption spectrum of the sample and an emission spectrum of the sample is obtained from the sample 100, and the presence or non-presence of a desired biomolecule may be determined by using identification and qualification of a spectroscopic peak. For example, a single-cycle THz wave or a multi-cycle THz wave is used as the response pulse wave 35, and the presence or non-presence of a biomolecule such as protein vibrating in a low frequency mode may be identified. In this case, the at least one spectrum may be obtained from a Fourier transform of the detected signal image.

According to the exemplary embodiment described above, for example, tens or hundreds of optical readout pulse arrays 45 may be generated using, for example, the one pair of echelons 41 and 43 to process scanning of the signal generated from the sample 100 once. Therefore, since a scan time of the signal 101 may be significantly reduced, a data collection time may also be reduced, thereby enabling improving a signal-to-noise ratio, securing time-space resolution, and measuring a very small signal.

In addition, a relationship between absorption and emission spectra indicating a 2D correlation spectroscopic structure and coupling between vibrational modes or electron transitions may be analyzed. In addition, an absorption spectrum or an emission spectrum may be obtained from a biomedical sample, and the presence or non-presence of a certain biomolecule may be determined by means of identification and qualification of a spectroscopic peak, and thus, information contributing to screening, diagnosis and/or monitoring of any disease may be provided. In addition, an in-test-tube or in-situ biomedical sample may be analyzed, and thus, a 2D spectroscopy system capable of invasively or noninvasively performing spectroscopic measurement may be implemented.

Figure 3:
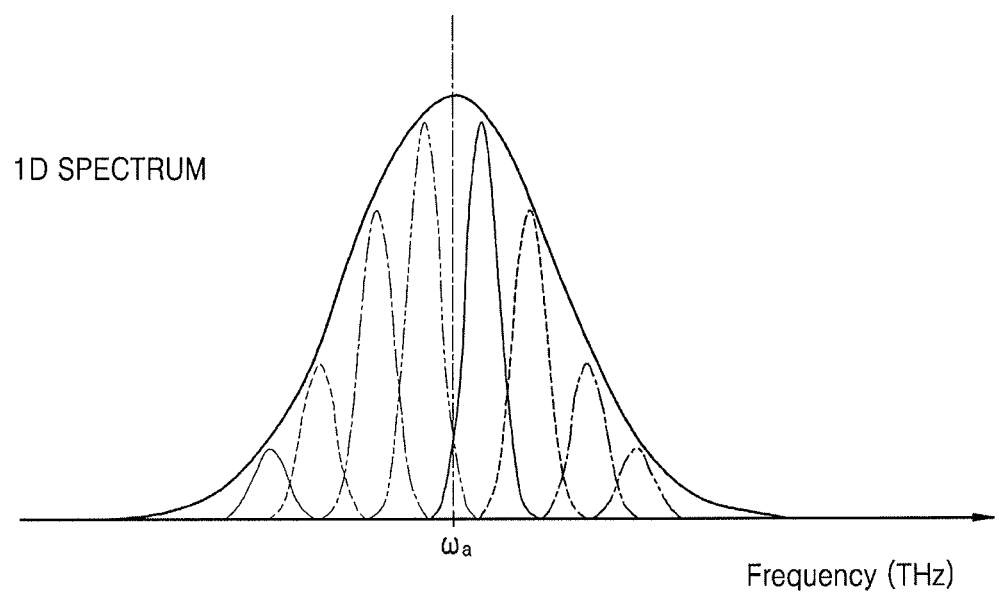
FIG. 3 illustrates a spectrum obtained by 1D spectroscopy.

FIG. 3 illustrates a spectrum obtained by 1D spectroscopy. A plurality of peaks under one broad peak may indicate a plurality of different spectra from a same mode on different molecules having different environments, thereby causing a vibrational frequency to be different between the molecules. Due to the plurality of different spectra, the spectrum obtained by 1D spectroscopy is non-uniformly broadened. It is difficult to determine whether the 1D spectrum is broad due to different molecules or is naturally broad due to fast vibrational dephasing or relaxation of a vibrational mode.

Figure 4:
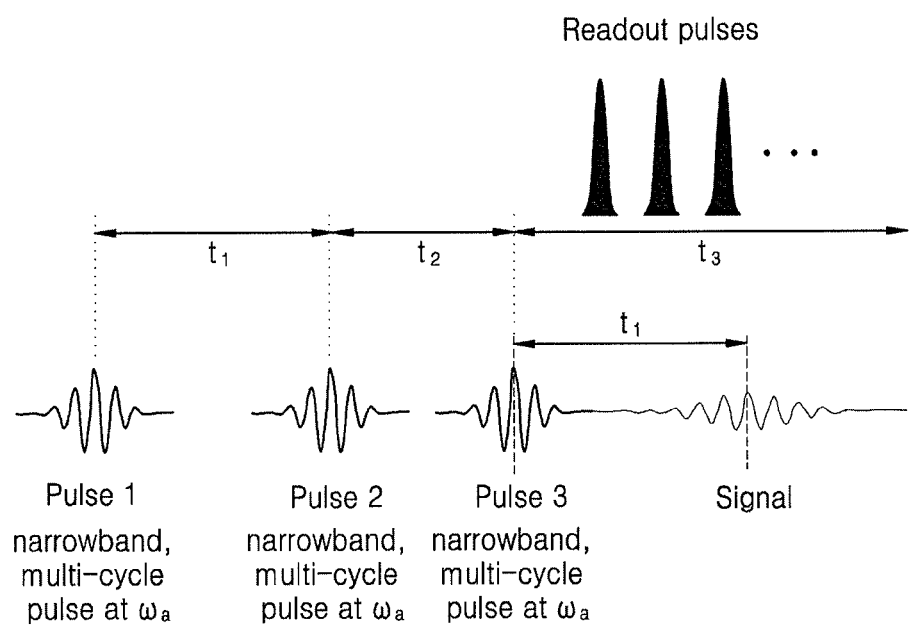
FIG. 4 illustrates a terahertz (THz) pumping pulse array which is usable to determine a cause of inhomogeneous broadening in 2D spectroscopic measurement.

FIG. 4 illustrates a pulse array which is usable to determine a cause of inhomogeneous broadening in 2D spectroscopic measurement. Referring to FIG. 4, three (i.e., first, second, and third) multi-cycle pulses of which the center frequency is $\omega_a$, e.g., THz pulses "pulse1," "pulse2," and "pulse3," may be sequentially irradiated upon the sample 100. The sample 100 emits a signal after a time $t_1$ elapses after irradiating the third multi-cycle pulse pulse3 on the sample 100. The signal is read out by using the optical readout pulse array 45 which is split into a plurality of regions, which are temporally discriminated from one another along a time axis $t_3$, and delayed. Accordingly, the signal may be read out by the optical readout pulse array 45 generated by means of single measurement or single laser shot. The spectroscopic measurement on the sample 100 may be repeated by time delay $t_1$ scanning. In FIG. 4, $t_2$ denotes a time delay between the second multi-cycle pulse pulse2 and the third multi-cycle pulse pulse3, and $t_3$ denotes a time for reading out the signal by using the optical readout pulse array 45 generated by means of single laser shot. In this aspect, the signal may be read out as a function of the time $t_3$ of the optical readout pulse array 45 generated by means of single shot.

As described above, the signal is read out by overlapping the optical readout pulse array 45, which is temporally and spatially split, with the signal generated from the sample 100, and 2D time records ($t_1$, $t_3$) are obtained by using a coherency time t1 between the first and second multi-cycle pulses pulse1 and pulse2 and the time $t_3$ for the optical readout pulse array 45, and accordingly, 2D measurement may be performed.

Figure 5:
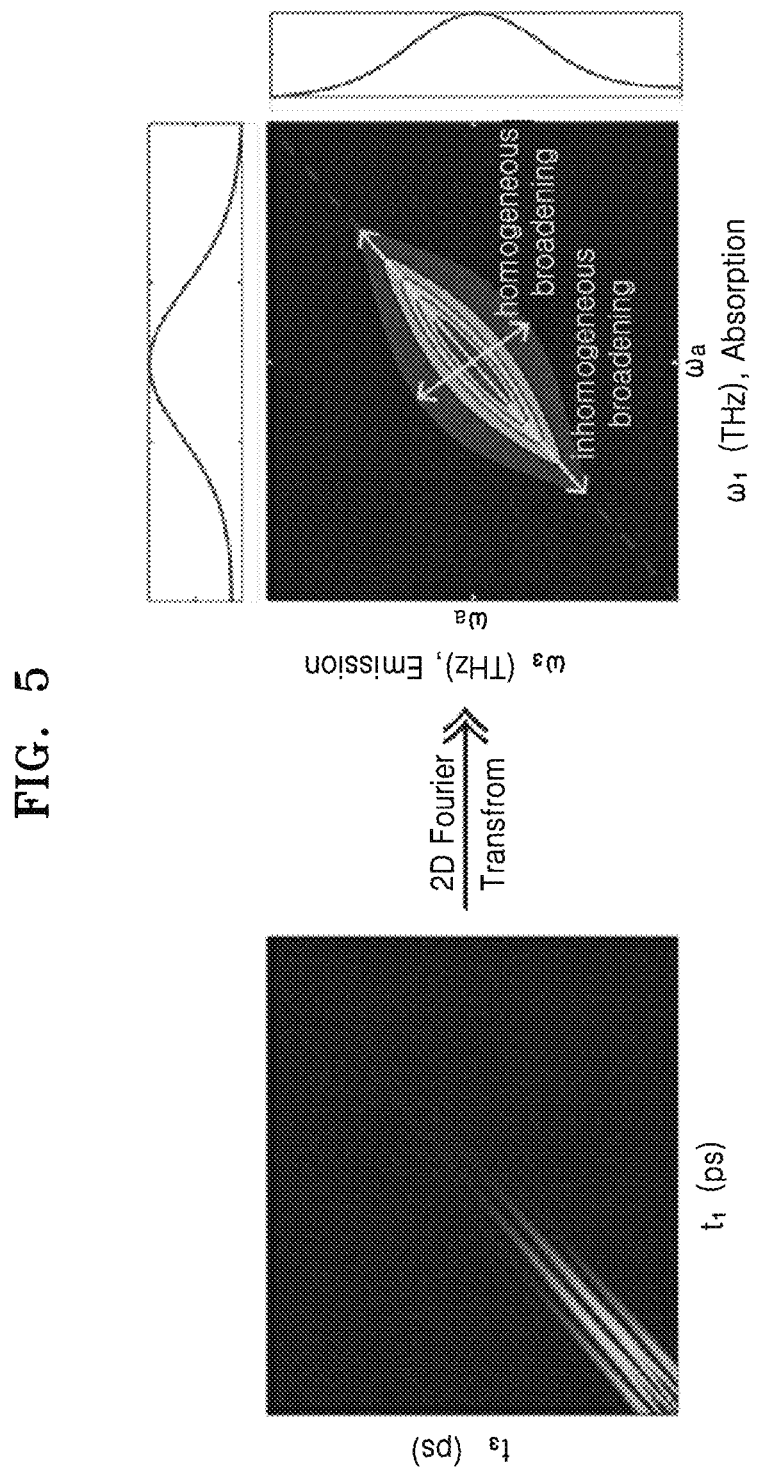
FIG. 5 illustrates a change in a signal field at a time $t_3$ according to a time interval $t_1$ between pulse1 and pulse2 when the pulse array of FIG. 4 is applied and a 2D Fourier transform on the signal field.

FIG. 5 illustrates a change in a measured signal value at the time $t_3$ of the optical readout pulse array according to the time interval $t_1$ between the first and second multi-cycle pulses pulse1 and pulse2 when the pulse array of FIG. 4 is applied and a 2D Fourier transform of the measured signal value.

A first time axis corresponds to the time interval $t_1$ between the first and second multi-cycle pulses pulse1 and pulse2, and a second time axis corresponds to the change in the signal value at the time $t_3$ of the optical readout pulse array 45. The 2D Fourier transform is performed such that a 2D spectrum follows two corresponding frequency axes. An absorption frequency axis $\omega_1$ indicates a frequency of an initial field which is absorbed so as to initialize a vibrational response of the sample 100. An emission frequency axis $\omega_3$ indicates a frequency of an emitted coherent signal. The emitted signal includes more cycles than an incident signal. As shown in a 2D Fourier transform graph, homogeneous dephasing of a vibrational mode appears in an anti-diagonal direction of the graph, and a homogeneous line width (given in the anti-diagonal direction of the spectrum) that is narrower than an inhomogeneous line width (given by a signal extending in a diagonal direction of the 2D Fourier transform graph) appears. This indicates inhomogeneous broadening in the diagonal direction and homogeneous broadening in the anti-diagonal direction.

Therefore, the 2D spectrum may exhibit more detailed spectroscopic characteristics than a 1D spectrum. In addition, when many vibrational modes exist, the vibrational modes overlap each other in the 1D spectrum and thus are difficult to be separated from each other, but the vibrational modes may be separated from each other in the 2D spectrum.

Figure 6:
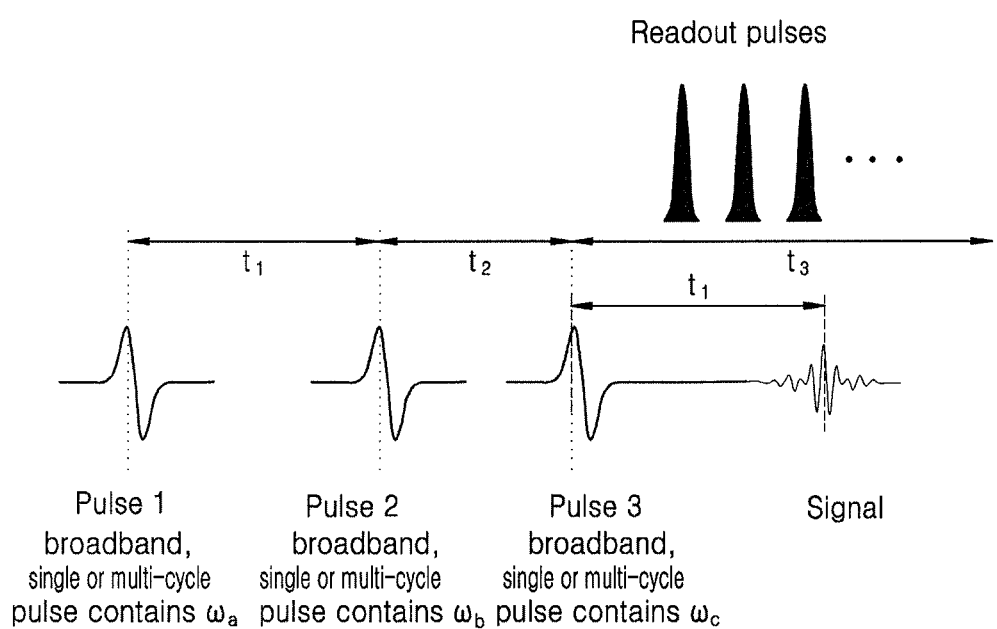
FIG. 6 illustrates a THz pulse array which is usable to determine coupling between vibrational modes.

FIG. 6 illustrates a pulse array which is usable to determine coupling between vibrational modes. Broadband single-cycle THz pulses including frequencies $\omega_a$, $\omega_b$, and $\omega_c$ may be irradiated on the sample 100. In this aspect, the pulses do not have to be a single cycle only if the pulses have a broadband which is wide enough to include three frequency modes. The sample 100 emits a signal after the time $t_1$ elapses after a third pulse pulse3. The signal may be read out as a function of the time $t_3$ of the optical readout pulse array 45 generated by means of single shot. This measurement may be repeated by scanning for the time $t_1$. The emitted signal may include the frequencies $\omega_a$, $\omega_b$, and $\omega_c$, and a signal field component at the frequency $\omega_c$ depends on a time delay between first two pulses, and specifically, a strength thereof vibrates at the frequencies $\omega_c$ and $\omega_a$.

Figure 7:
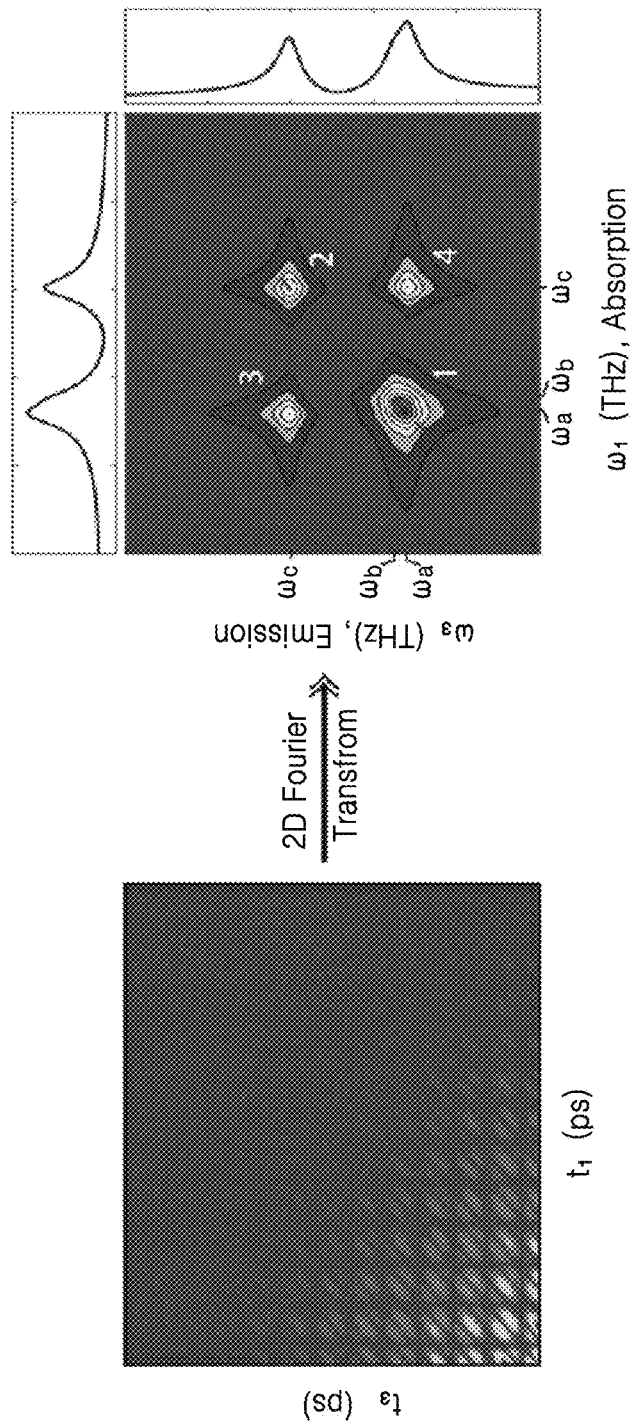
FIG. 7 illustrates a signal field change at the time $t_3$ according to the time interval $t_1$ between pulse1 and pulse2 when the pulse array of FIG. 6 is applied and a 2D Fourier transform on the signal field change.

FIG. 7 illustrates a change in a signal value of the optical readout pulse array 45 at the time $t_3$ according to the time interval $t_1$ between pulse1 and pulse2 when the pulse array of FIG. 6 is applied and a 2D Fourier transform of the signal value.

In 2D time records $(t_1, t_3)$, a component of a signal value of which a frequency is $\omega_c$ depends on a time delay between first two pulses, and specifically, a strength thereof vibrates at the frequencies $\omega_c$ and $\omega_a$. Therefore, after the 2D Fourier transform, a 2D spectrum exhibits a diagonal peak 2 at $(\omega_c, \omega_c)$ and also exhibits an off-diagonal peak 4 at $(\omega_c, \omega_a)$. The two peaks 2 and 4 indicate that vibrational modes are coupled, and this is usually exhibited when molecules approach each other. A mode at the frequency $\omega_b$ may be coupled to other modes in which off-diagonal peaks (not shown) are generated but is not coupled to the frequencies $\omega_c$ and $\omega_a$. Therefore, based on the 2D spectrum, not only vibrational modes of various frequencies but also vibrational modes coupled to another mode may be analyzed. For example, a time delay $t_2$ may be changed, and when modes $\omega_c$ and $\omega_a$ are coupled by means of time-dependent relaxation from a high frequency mode $\omega_c$ to a low frequency mode $\omega_a$, a peak 3 exhibits signal field emission at $\omega_a$, which occurs due to gradually growing coupling, as a function of $t_2$. Therefore, even a plurality of modes coupled in a same mode may be identified by relaxation dynamics to a coupling mode.

Therefore, an inhomogeneously broadened spectrum may be analyzed, and mode coupling may also be analyzed. Accordingly, for a biomolecule, many vibrational modes of which a 1D spectrum is too broad or which are very difficult to detect may be detected.

As described above, according to a 2D spectroscopy system and a 2D spectroscopic analysis method according to the one or more of the above exemplary embodiments, spectroscopic analysis information of a sample to be analyzed is acquired by generating a plurality of response pulse waves having a wavelength range to which the sample reacts and having a relative time delay by using a plurality of first light pulses having a relative time delay, irradiating the plurality of response pulse waves upon the sample, forming an optical readout pulse array by splitting second light pulse into a plurality of regions having different respective time delays and spatially discriminated from one another, and reading out a signal by overlapping the optical readout pulse array with a signal generated from the sample in response to the irradiation of the plurality of response pulse waves having a relative time delay upon the sample. Therefore, since scanning of the signal generated from the sample may be processed one time, a scan time of the signal may be significantly reduced, thereby reducing a data acquisition time.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A two-dimensional (2D) spectroscopy system comprising:
   a pulsed light source;
   a beam splitter configured to split light pulse provided from the pulsed light source into first light pulse and second light pulse;
   a light transmission delayer configured to form a plurality of first light pulses from the first light pulse and to cause a first relative time delay with respect to the plurality of first light pulses;
   a response pulse wave generator configured to generate a plurality of response pulse waves having a wavelength range to which a sample to be analyzed responds and having a second relative time delay by using the plurality of first light pulses sequentially inputted from the light transmission delayer, and to irradiate the plurality of response pulse waves upon the sample;
   an optical readout pulse array generator configured to form an optical readout pulse array by splitting the second light pulse into a plurality of regions which have different respective time delays and which are spatially discriminated from one another;
   a reader configured to read out a signal by overlapping the optical readout pulse array with a signal generated from the sample in response to the irradiation of the plurality of response pulse waves upon the sample;

an image detector configured to detect a signal image of the signal read out by the reader; and a signal processor configured to acquire spectroscopic analysis information which relates to the sample by processing the signal image detected by the image detector.

2. The 2D spectroscopy system of claim 1, wherein the plurality of response pulse waves includes at least two response pulse waves, and the signal generated from the sample is generated by irradiating the plurality of response pulse waves upon the sample.

3. The 2D spectroscopy system of claim 1, wherein the light transmission delayer is further configured to control the first relative time delay.

4. The 2D spectroscopy system of claim 1, wherein the optical readout pulse array generator is further configured to temporally and spatially split the second light pulse into a 2D array of optical readout light pulses by using a first echelon and a second echelon which is arranged crossed to the first echelon.

5. The 2D spectroscopy system of claim 1, further comprising at least one from among:

a first relay focuser configured to collimate and condense the response pulse waves generated by the response pulse wave generator and to focus the response pulse waves on the sample; and a second relay focuser configured to collimate and condense the signal generated from the sample and to input the signal to the reader.

6. The 2D spectroscopy system of claim 5, wherein the at least one from among the first relay focuser and the second relay focuser comprises one pair of off-axis parabolic reflectors.

7. The 2D spectroscopy system of claim 1, wherein the reader comprises an electro-optic (EO) crystal for configured to read out a signal by performing EO sampling which includes overlapping the signal generated from the sample with the optical readout pulse array.

8. The 2D spectroscopy system of claim 7, further comprising:

a quarter-wave plate configured to change a polarization of the signal which is read out by the reader; and a polarization splitter configured to split the signal, which has propagated through the quarter-wave plate, based on the changed polarization thereof, wherein each of the quarter-wave plate and the polarization splitter is arranged between the reader and the image detector.

9. The 2D spectroscopy system of claim 8, wherein the polarization splitter includes a Wollaston prism.

10. The 2D spectroscopy system of claim 1, wherein the sample comprises at least one from among a semiconductor, a dielectric, and a biomolecule.

11. The 2D spectroscopy system of claim 1, wherein each of the plurality of response pulse waves comprises one from among a single-cycle visible ray, a multi-cycle visible ray, an infrared ray, and a terahertz (THz) wave.

12. The 2D spectroscopy system of claim 1, wherein the sample includes a biomedical sample, and the signal processor is further configured to determine a presence or a non-presence of a desired biomolecule by using identification and quantification of a spectroscopic peak for at least one from among an absorption spectrum of the sample and an emission spectrum of the sample.

13. The 2D spectroscopy system of claim 1, wherein the spectroscopic analysis information includes at least one from among an absorption spectrum of the sample and an emission spectrum of the sample, and the at least one from among the absorption spectrum and the emission spectrum is generated by using a Fourier transform of the detected signal image.

14. A two-dimensional (2D) spectroscopic analysis method comprising:

splitting light pulse provided from a pulsed light supplier into first light pulse and second light pulse;

forming a plurality of first light pulse from the first light pulse and causing a first relative time delay with respect to the plurality of first light pulses;

generating a plurality of response pulse waves having a wavelength range to which a sample to be analyzed responds and having a second relative time delay by using the plurality of first light pulses having the first relative time delay, and irradiating the plurality of response pulse waves upon the sample;

forming an optical readout pulse array by splitting the second light pulsed into a plurality of regions which have different respective time delays and which are spatially discriminated from one another;

reading out a signal by overlapping the optical readout pulse array with a signal generated from the sample in response to the irradiation of the plurality of response pulse waves upon the sample;

detecting a signal image of the signal which is read out; and acquiring spectroscopic analysis information which relates to the sample by processing the detected signal image.

15. The 2D spectroscopic analysis method of claim 14, wherein the plurality of response pulse waves includes at least two response pulse waves, and the reading out the signal includes overlapping the optical readout pulse array with the signal generated from the sample by the irradiating the plurality of response pulse waves upon the sample.

16. The 2D spectroscopic analysis method of claim 14, wherein each of the plurality of response pulse waves comprises one from among a single-cycle visible ray, a multi-cycle visible ray, a single-cycle infrared ray, a multi-cycle infrared ray, a single-cycle terahertz (THz) wave, and a multi-cycle THz wave.

17. The 2D spectroscopic analysis method of claim 14, wherein the forming the optical readout pulse array includes forming the optical readout pulse array to have different respective time delays and to be spatially discriminated by using a first echelon which is focused on the sample and a second echelon which is arranged opposite to the first echelon and which is focused on the sample.

18. The 2D spectroscopic analysis method of claim 14, wherein the sample includes a biomedical sample, and the acquiring the spectroscopic analysis information which relates to the sample comprises determining a presence or a non-presence of a desired biomolecule by acquiring at least one from among an absorption spectrum of the sample and an emission spectrum of the sample and using identification and quantification of a spectroscopic peak.

19. The 2D spectroscopic analysis method of claim 14, wherein the spectroscopic analysis information includes at least one from among an absorption spectrum of the sample and an emission spectrum of the sample, and
the at least one from among the absorption spectrum and the emission spectrum is generated by using a Fourier transform of the detected signal image.

\* \* \* \* \*